United States Patent [19]

DeHainaut et al.

[11] Patent Number: 4,981,354

[45] Date of Patent: Jan. 1, 1991

[54] OPTICAL DIFFERENTIAL TILT SENSOR

[75] Inventors: Christopher R. DeHainaut; John D. Gonglewski; Dennis C. Duneman, all of Albuquerque; Morten Jenks, Corrales; David F. Holmes, Albuquerque, all of N. Mex.

[73] Assignee: The United States of America as represented by the Secretary of the Air Force, Washington, D.C.

[21] Appl. No.: 322,380

[22] Filed: Mar. 13, 1989

[51] Int. Cl.$^5$ .............................. C01C 1/00; G01J 4/00
[52] U.S. Cl. ..................................... 356/141; 356/152; 356/144; 356/147; 356/365; 350/370; 250/203.1
[58] Field of Search ...................... 356/5, 141, 152, 45, 356/144, 147, 351, 365, 368; 350/370; 250/203 R, 203.1

[56] References Cited

U.S. PATENT DOCUMENTS

| | | | |
|---|---|---|---|
| 3,623,814 | 11/1971 | Buhrer | 356/365 |
| 4,624,563 | 11/1986 | Johnson | 356/152 |
| 4,639,586 | 1/1987 | Fender et al. | 250/201 |
| 4,667,090 | 5/1987 | Carreras et al. | 250/201 |

OTHER PUBLICATIONS

De Hainaut et al., "Design of a Wide Field of View Phased Array Telescope," *Optical Engineering*, vol. 27, No. 9, Sep. 1988, pp. 736-739.

De Hainaut et al., "System Design of a Wavefront Sensing Package for a Wide Field of View Optical Phased Array," *Optical Engineering*, vol. 27, No. 9, Sep. 1988, pp. 785-792.

*Primary Examiner*—Thomas H. Tarcza
*Assistant Examiner*—Linda J. Wallace
*Attorney, Agent, or Firm*—Bernard E. Franz; Donald J. Singer

[57] ABSTRACT

An electrooptical sensor system directly measures the angle between two nearly parallel collimated laser beams. After focussing with a positive lens, the beams pass through a photoelastic modulator, a quarter wave retardation plate, and two polarizers. The beams then hit a lateral cell position sensor. Electrical signals from the lateral cell are processed with special electronics to yield a voltage which is proportional to the angular difference between the two beams. The sensor measures extremely small angles and operates at a high bandwidth. Its primary application is in the control of phased array optical telescopes.

6 Claims, 3 Drawing Sheets

Optical schematic of the differential tilt sensor.

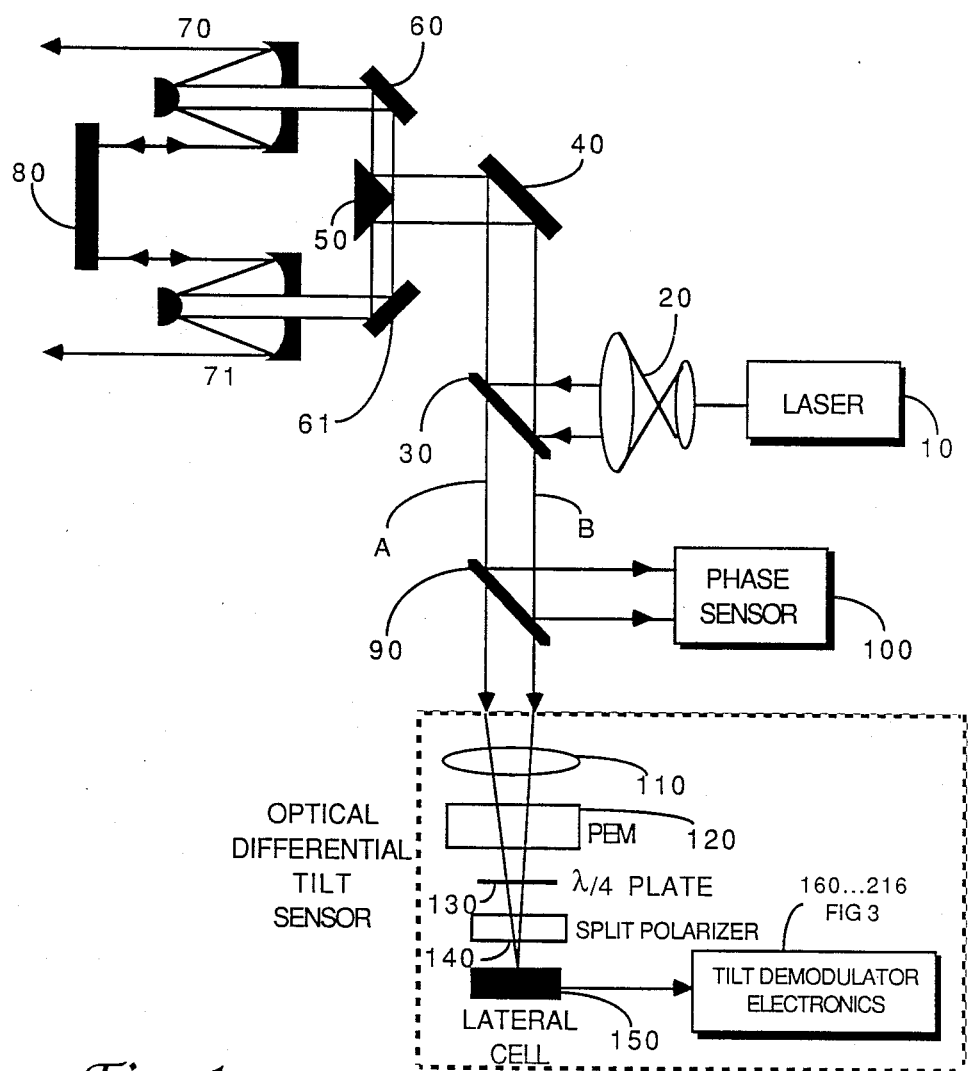
Fig. 1 Optical schematic of the differential tilt sensor.

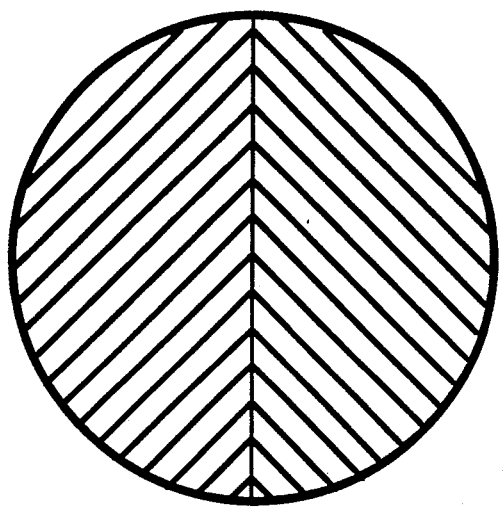
Fig. 2   The split polarizer. 140

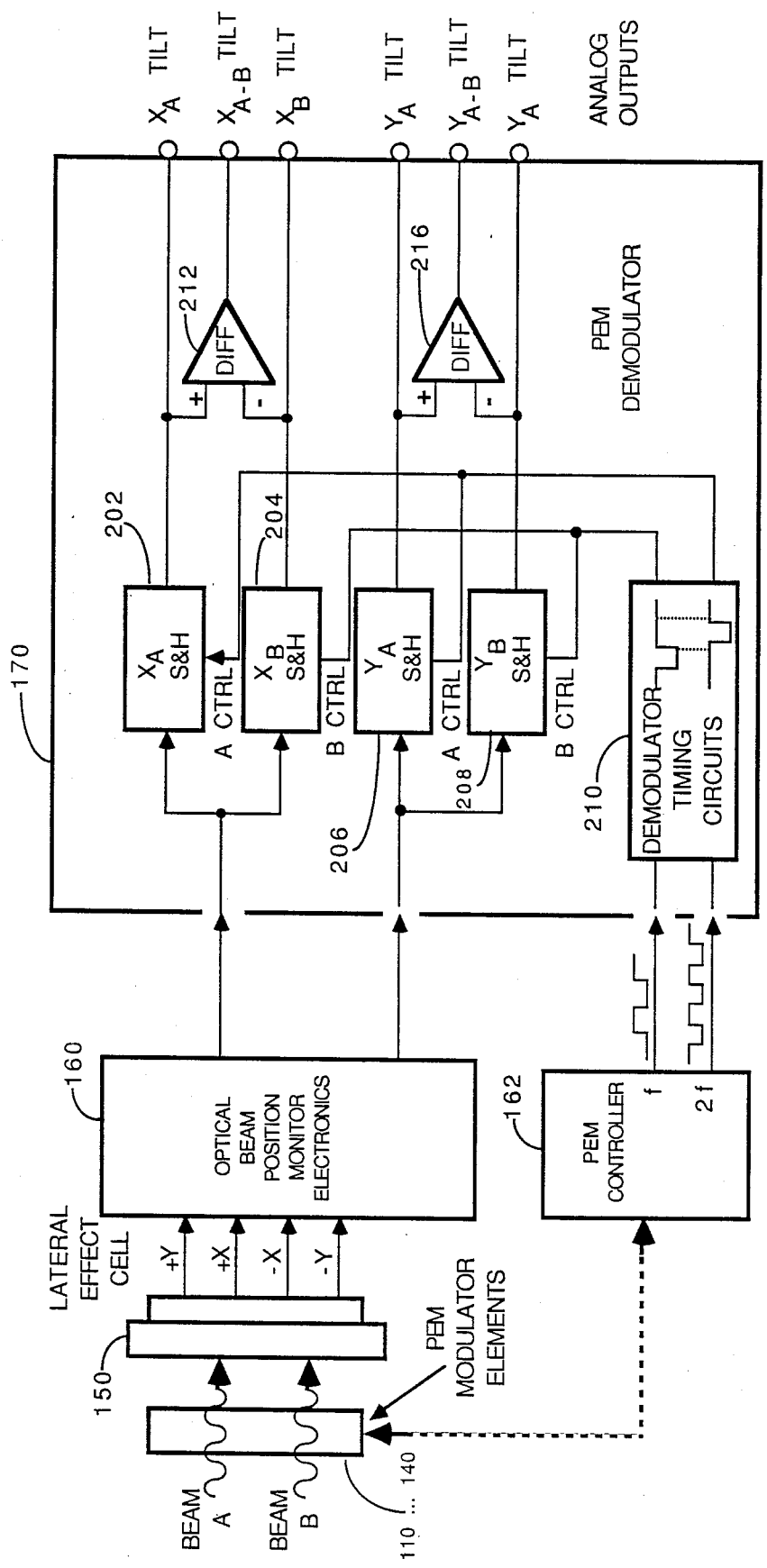
Fig. 3  The tilt demodulator electronics.

OPTICAL DIFFERENTIAL TILT SENSOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an optical differential tilt sensor, and more particularly to a high bandwidth differential tilt sensor for use in the control of phased array telescopes.

In the past the use of multiple optical telescopes in a phased array has encountered a number of operational problems. One of these problems has been experimentally observed to involve low frequency drift in the relative positions of the images from each of the individual telescopes. In order to keep the telescopes properly pointed and phased with respect to each other, frequent manual compensation had to be provided. Furthermore, this manual compensation had to be provided on a continuous basis, since the environment continually disturbs the optical, mechanical and electronic elements of the telescope system.

U.S. patents of interest include No. 4,639,586 to Fender et al, which teaches a technique using samples of the transmitted beam to control optical path lengths and therefore the phase through separate telescopes so that the beams add coherently at the receiver. Carreras et al in U.S. Pat. No. 4,667,090 teaches a plurality of telescopes wherein output return signals are applied directly after sampling to a photo-detector for determination of the constant and transient tilt error of the telescope system.

The drift problem in multi-telescope trackers has been addressed by Carreras et al. The Carreras invention solves the problem by augmenting the standard wide bandwidth tilt sensor which measures the tilt error in each telescope with a low frequency differential tilt sensor which is common to all three telescopes. The low frequency sensor is immune to the drift problem since it uses a common quad cell photo-detector, common optics, and largely common electronics for all three telescopes. It measures only tilt differences among the three beams, and therefore is insensitive to any low frequency drift that affects all three beams in the same way.

The main problem with the Carreras invention is the use of the mechanical chopper. The chopper produces vibration and air turbulence which decrease the overall accuracy of the tracker system. The chopper makes the optical system more complicated since it does not eliminate the need for the standard wide bandwidth tilt sensor.

SUMMARY OF THE INVENTION

An objective of the invention is to provide a high bandwidth differential tilt sensor for use in the control of phased array telescopes.

Another objective is to solve the drift problem and eliminate the need for a mechanical chopper.

The invention relates to an optical sensor which measures the angle or tilt between two nearly parallel collimated laser beams for use in the control of phased array telescopes. The device comprises a laser source of light to provide two parallel beams, and a folding mirror for deflecting the parallel beams to a beam combiner. The beam combiner diverts the path of the two beams to a first and second mirror. Each beam is reflected in a parallel manner from first and second telescope which receives the beam from first and second reflecting mirrors. A portion of the beam from each telescope is reflected back into the optical system by a plane mirror. These reflective beams will be measured to determine the tilt angle. The reflected beams, as stated, are reflected back through the aforesaid optics to a phase sensor and a photoelastic modulator and then to a quarter wave plate. From the quarter wave plate a split polarizer is able to determine the angular differential between the two beams. This difference angle between the two beams is calculated in a tilt demodulator after detection by a lateral cell.

The invention provides advantages over alternative tilt sensors. It eliminates the low frequency drift problem since it is a true differential tilt sensor. Its design is simpler than the best alternative, the Carreras invention, since it eliminates the troublesome mechanical chopper and the additional optics associated with it. The present invention provides an inherently wide bandwidth device since photoelastic modulator typically operate at frequencies of 20 to 60 KHz whereas mechanical choppers are limited to a few KHz.

BRIEF DESCRIPTION OF THE DRAWING

FIG. 1 is a symbolic diagram showing an optical schematic of a differential tilt sensor;

FIG. 2 is a diagram showing the split polarizer which is part of the system of FIG. 1; and FIG. 3 is a functional block diagram of the tilt demodulator electronics of FIG. 1.

DETAILED DESCRIPTION

The invention is disclosed in two papers published by the Society of Photo-Optical Instrumentation Engineers in *Optical Engineering*, September 1988, Vol. 27, No. 9, one at paqes 736–739 by C. R. DeHainaut et al titled "Desiqn of a Wide Field of View Phased Array Telescope", and the other at pages 785–792 by J. D. Gonglewski et al titled "System Design of a Wavefront Sensing Package for a Wide Field of View Optical Phased Array". These two papers are hereby incorporated by reference.

FIG. 1 shows the primary use of the present invention. A collimated, polarized, monochromatic beam from an alignment laser 10 passes through a beam expander 20, and reflects off a beam splitter 30 and a folding mirror 40. A beam combiner 50 then splits the beam into two beams which go to two actuated mirrors 60 and 61. The beams then go to two telescopes 70 and 71. A plane mirror 80 spans the two telescopes and reflects a sample of the outgoing beam from each telescope back through the system. We call these two beams from telescope 70 and telescope 71 beam A and B respectively, as shown by the reference characters A and B in FIG. 1. This sample passes through beam splitter 30 and is again split in two by a beam splitter 90. The reflected part of this beam enters a differential phase sensor 100, which is described in U.S. Pat. No. 4,639,586 by Fender et al. The transmitted beam from beam splitter 90 then goes to the differential tilt sensor which is the subject of this patent application.

The purpose of the differential sensor is to accurately measure the small pointing angle difference (tilt) of beam A with respect to beam B. Referring again to FIG. 1, the collimated beams from beam splitter 90 are focused by lens 110 and pass through the photoelastic modulator 120. This photoelastic modulator modulates at a frequency of 42 KHz and is commercially available from Hinds International, Inc. of Portland, Oreg. The modulating crystal in the photoelastic modulator is centered on and normal to the beam's optical axis. Its principal transverse crystal axis is rotated about the optical axis 45 degrees from the beam's plane of polarization. The photoelastic modulator is adjusted to provide a periodic + and −¼ wave of retardation to the laser beam. A quarter wave plate 130 provides a bias to shift the photoelastic modulator's retardation range from between + and −¼ wave to between 0 and ½ wave. The light emerging from the quarter wave plate therefore is oscillating between vertical and horizontal polarization at a frequency of 42 KHz. If desired, the positions of the lens 110, the photoelastic modulator 120, and the quarter wave plate 130 may be interchanged without affecting the operation.

The beams then go to the split polarizer 140. As illustrated in FIG. 2, it is made of two pieces of polarizing film whose polarization axes are orientated 90 degrees from each other. The split polarizer is located in a plane conjugate to mirror 80, which is the aperture stop of this alignment system, so that beam A always passes entirely through one piece of polarizing film and beam B always passes through the other. Together, the quarter wave plate, photoelastic modulator and split polarizer function as a chopper which alternately blocks beam A and then beam B from reaching the lateral effect cell 150.

The lateral effect cell along with the Optical Beam Position Monitor electronics unit 160 (FIG. 3) measure horizontal (X) and vertical (Y) centroid components of the convergent light beams coming from the split polarizer. The Optical Beam Position Monitor (OBPM) is very similar to a number of commercially available instruments that process lateral effect sensor output currents into X & Y centroid signals. The OBPM used here uses a standard design but substitutes higher frequency amplifier and divider integrated circuits to achieve a wider bandwidth (100 KHz) than was available commercially to accommodate the 42 KHz modulation frequency of the photoelastic modulator. Electrical output from the lateral cell is comprised of four currents that, after processing, relate to the angular tilts of optical beams A and B. OBPM signal processing consists of amplification, summing, differencing, and normalization. Combined centroids measured by the OBPM oscillate between that of beam A and beam B at the modulation frequency of photoelastic modulator 120. For this application, the centroid at the lateral cell actually represents the angular orientations of the optical beams A and B. However, other applications could just as easily measure and control optical beam translation instead of beam angle.

Beam angles X and Y are the two primary outputs generated by the OBPM. They represent a combination of beam A tilt and beam B tilt and are of little use until they can be separated. A means for separating them is provided for by the photoelastic modulator and quarter wave plate combination. Together they periodically oscillate the plane of polarization (about the optical axis) of all beams passing through them; first 45 degrees in one direction, then 45 degrees in the other. At each extreme, polarization of one beam, either A or B is aligned with its polarizer for maximum transmission. At the same instant in time the other beam, whose polarizer is rotated 90 degrees relative to the first, experiences maximum attenuation. As a result, once each modulation cycle, each optical beam's angular position is available at the OBPM output to be viewed without interference from its companion beam.

Demodulation is accomplished with four identical sample & hold (S&H) circuits, each of which provides one X or one Y tilt sample for either beam A or beam B. Their outputs are updated once every PEM modulation cycle. Timing signals for controlling the sample & hold circuits are derived from PEM control unit 162 $f$ and $2f$ sync outputs. These timing signals provide adjustable sample delay and acquisition time. In addition to the economy of processing tilt information for two optical beams simultaneously through a common optical train, position sensor, and OBPM, an even greater benefit can be realized if it is angular difference between the two beams that is of interest. Due to the commonality of the beam paths and signal processing used with this technique, mechanical and electronic drifts and inaccuracies effect both beams in an identical manner. This condition can yield highly accurate differential angle measurements even when common path elements perform poorly. High performance differential amplifiers are connected between the $X_a$ and $X_b$ demodulator outputs to obtain the angular difference signal $X_{a-b}$. In a similar manner $Y_{a-b}$ is obtained from the $Y_a$ and $Y_b$ outputs. Due to the high bandwidth required for PEM signal processing, output noise levels will be greater than when processing is carried out at lower frequencies. Low pass filters inserted after the sample & hold circuits reduce some of this excess noise and provide anti-aliasing protection if A/D converters are required for further processing.

ALTERNATIVES

The system as described above controls only two subaperture telescopes, but multiple differential tilt sensors can be used to control an arbitrarily large number of subaperture telescopes. Where more than one pair of beams must be measured, they can all share the same photoelastic modulator and quarter wave plate.

For this application, the centroid positions at the lateral cell actually represent the angular orientations of optical beams A and B. However, other applications could just as easily measure and control optical beam translation instead of beam angle.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. An optical differential tilt sensor which measures the angle between two closely parallel collimated laser beams for use in the control of phased array telescopes, the two laser beams being designated a first beam and a second beam, said two laser beams being produced by a plane mirror which spans two telescopes and reflects a sample of an outgoing beam from each telescope back through first optical apparatus to the optical differential tilt sensor;

wherein said optical differential tilt sensor comprises a lens, a photoelastic modulator, a quarter wave plate, a split polarizer, a lateral effect cell, and a tilt demodulator electronic unit; with the lens, the photoelastic modulator, and the quarter wave plate optically coupled in tandem between said first optical apparatus and the split polarizer; and with the split polarizer optically coupled to the lateral effect cell, so that the two laser beams come from the split polarizer and converge on the lateral effect cell;

wherein the lateral effect cell and means for position sensing measures horizontal (X) and vertical (Y) centroid components of the converging light beams coming from the split polarizer, to produce electrical signals at outputs coupled to the tilt demodulator electronic unit;

wherein the tilt demodulator electronic unit comprises means for processing said electrical signals to detect a difference angle between the two beams.

2. An optical differential tilt sensor according to claim 1, wherein the photoelastic modulator (PEM) includes a modulating crystal which modulates at a given frequency to provide PEM modulatic cycles, the modulating crystal being centered on and normal to the optical axis of said two laser beams, with its principal transverse crystal axis rotated about the optical axis 45 degrees from the beam's plane of polarization, the photoelastic modulator being adjusted to provide + and $-\frac{1}{4}$ wave of retardation to the laser beam;

wherein the quarter wave plate provides a bias to shift the photoelastic modulator's retardation range from between + and $-\frac{1}{4}$ wave to between 0 and $\frac{1}{2}$ wave, so that the light emerging from the combination of the lens, the photoelastic modulator and the quarter wave plate is oscillating between vertical and horizontal polarization at said given frequency, the positions of the lens, the photoelastic modulator and the quarter wave plate being interchangeable without affecting the operation.

3. An optical differential tilt sensor according the claim 2, wherein the split polarizer is made of two pieces of polarizing film whose polarization axes are oriented 90 degrees from each other, the split polarizer being located in a plane conjugate to said plane mirror, which is the aperture stop of this alignment system, so that the first beam always passes entirely through one piece of polarizing film and the second beam always passes through the other, whereby together, the quarter wave plate, the photoelastic modulator and the split polarizer function as a chopper which alternately blocks the first beam and then the second beam from reaching the lateral effect cell, wherein the lateral effect cell along with the tilt demodulator electronic unit measure the horizontal and vertical centroid of the light coming from the split polarizer, so that the centroid measurement oscillates between the centroid of the first beam and the centroid of the second beam at said given frequency of the photoelastic modulator.

4. An optical differential tilt sensor according to claim 3, wherein electrical output from the lateral effect cell is comprised of four currents that, after said processing in the tilt demodulator electronic unit, relate to the angular tilts of the first and second means, wherein said tilt demodulator electronic means includes an Optical Beam Position Monitor Unit (OBPM) having a wide bandwidth (100 KHz) for performing said processing which comprises amplification, summing, differencing, and normalization, with X and Y beam angles, derived from the lateral effect cell, being the two primary outputs generated by the OBPM, representing a combination of tilt of the first beam and tilt of the second beam; wherein the photoelastic modulator and quarter wave plate together periodically oscillate the plane of polarization (about the optical axis) of all beams passing through them; first 45 degrees in one direction, then 45 degrees in the other, so that at each extreme, polarization of one of said beams is aligned with its polarizer for maximum transmission, and at the same instant in time the other beam, whose polarizer is rotated 90 degrees relative to the first, experiences maximum attenuation, and as a result, once each modulation cycle, the angular position of each of said beams is available at the OBPM output to be viewed without interference from the other of said beams.

5. An optical differential tilt sensor according to claim 4, wherein said tilt demodulator electronic means includes four identical sample & hold (S&H) circuits, each of which provides one X or one Y tilt sample for either the first beam or the second beam for demodulation, their outputs being updated once every PEM modulation cycle, a PEM control unit which includes means providing sync outputs at said given frequency and twice said given frequency, said sync outputs being used as timing signals for controlling the sample and hold circuits, these timing signals providing adjustable sample delay and acquisition time, and differential amplifier means connected to outputs of the sample and hold circuits to obtain angular difference signals.

6. An optical differential sensor which measures a parameter between two nearly parallel collimated laser beams, the two laser beams being produced by a plane mirror which spans two telescopes and reflects a sample of an outgoing beam from each telescope back through first optical apparatus to the optical differential sensor;

wherein said optical differential sensor comprises a lens, a photoelastic modulator, a quarter wave plate, a split polarizer, a lateral effect cell, and a demodulator electronic unit; with the lens, the photoelastic modulator, and the quarter wave plate optically coupled in tandem between said first optical apparatus and the split polarizer; and with the split polarizer optically coupled to the lateral effect cell, so that the two laser beams come from the split polarizer and converge on the lateral effect cell;

wherein the lateral effect cell and means for position sensing measures horizontal (X) and vertical (Y) centroid components of the converging light beams coming from the split polarizer, to produce electrical signals at outputs coupled to the demodulator electronic unit;

wherein the demodulator electronic unit comprises means for processing said electrical signals to detect a difference relating to said parameter between the two beams.

* * * * *

UNITED STATES PATENT AND TRADEMARK OFFICE
CERTIFICATE OF CORRECTION

PATENT NO. : 4,981,354
DATED : January 1, 1991
INVENTOR(S) : Christopher R. DeHainaut et al It is certified that error appears in the above-identified patent and that said Letters Patent is hereby corrected as shown below:

Col 2, line 4, "telescope" should be ---telescopes---.

Col 2, line 25, "modulator" should be ---modulators---.

Col 2, line 42, "Desiqn" should be ---Design---.

Col 5, claim 2, line 5, "modulatic" should be ---modulation---.

Col 5, claim 3, line 1, "the" should be ---to---.

Col 6, claim 4, line 1, "means" should be ---beams---.

Signed and Sealed this

Twenty-first Day of July, 1992

Attest:

DOUGLAS B. COMER

*Attesting Officer*   *Acting Commissioner of Patents and Trademarks*